United States Patent Office
3,514,184
Patented May 26, 1970

3,514,184
BEAM-PATH SPLITTING ELEMENT FOR AN OPTICAL INSTRUMENT
Georg Vogl, Saltsjobaden, Sweden, assignor, by mesne assignments, to Jungner Instrument Aktiebolag, Stockholm, Sweden
Filed Jan. 17, 1967, Ser. No. 609,869
Int. Cl. G02b 27/10, 27/32
U.S. Cl. 350—173  2 Claims

ABSTRACT OF THE DISCLOSURE

An optical instrument for merging two light beams into one light beam in which a beam merging body, made up of two transparent wedge-shaped glasses which form a thin flat wedge and between which a figure such as a reticle made of reflecting material is interposed, is positioned in the optical instrument in a position such that one of the two light beams will enter and be reflected through one and the same parallel face of the flat plate and the other of the two light beams will pass through the flat plate.

---

The present invention generally relates to improvements in optical instruments, and more particularly to elements for splitting the beam path of an optical instrument, such as a gun-sight telescope.

The solution to the problem of splitting the beam path within an optical instrument is based on the principle of employing a reflecting surface. For this purpose, the normal practice has been to use either an inclined glass plate or a so-called Abbe cube or prism. The latter is composed of two right, isosceles pentahedral prisms, i.e. transparent solids having three possible optical function faces, which prisms are cemented together at their diagonal faces, the diagonal face of one prism being transparently metallized and partially reflecting. This latter diagonal face serves as a beam-path splitting or dividing face.

The Abbe cube or prism has the advantage of being disposable in a position with the exposed parallel bounding faces perpendicular to the optic axis of the instrument, but since in this case its reflecting face will be disposed at an angle of 45° relative to the optic axis, the beam path will be split at an angle of 90°. This makes the splitting arrangement, and thus the instrument as a whole, rather bulky.

When using an inclined glass plate, on the other hand, its parallel flat faces will form with the optic axis an angle which always differs from a right angle. In this case one has a greater liberty of selecting a splitting or dividing angle taking into account the space available within the instrument and the most suitable design of the latter. However, there will occur a parallel displacement of the beam path, and in cases where the incident rays are divergent, as astigmatic error will appear which must be eliminated by particular corrective means.

The present invention has for its primary object to provide, for an optional instrument, a beam-path splitting or dividing element which combines in itself the advantages of the two beam-path splitting devices referred to without suffering from their drawbacks.

Another object of the invention is to provide a beam-path splitter which is economical in manufacture by minimizing the polishing work necessary.

A further object of the invention is to provide a beam-path splitter which permits essential saving in space, both for the splitter per se and for the optical system, and thus for the instrument, as such.

A still further object of the invention is to provide a beam-path splitting or dividing element which involves an essential technical advance over and above the Abbe cube or prism, in that the inventive beam-path splitter can be employed, not only to divide or merge two light beams, but also, at the same time, to provide a reticle.

A still further object associated with that of the last-preceding paragraph resides in the provision of a beam-path splitter which distinguishes from prior-art splitters for gun-sight optics of the Abbe-prism type having a reticle making the target visible without any loss in illumination while at the same time making the reticle appear conveniently as a black figure which will only have to be illuminated separately, when daylight is insufficient.

For the object thus stated, according to the present invention, a beam-path splitting or dividing element for an optical instrument, such as a gun-sight telescope, is mainly characterized by comprising two transparent wedge glasses associated with each other at their opposed inclined faces to form a parallel-faced flat plate, the surface of association of this flat plate being reflecting and serving as the beam-path splitting-face of the element.

The beam-path splitter thus provided has the further advantage of enabling one of the two beam paths to be refracted at the entrance face of the element and, thereby, to be given a particularly favorable direction.

The invention and its advantages will be further elucidated hereinafter in conjunction with the accompanying drawing, in which.

Figure 1:
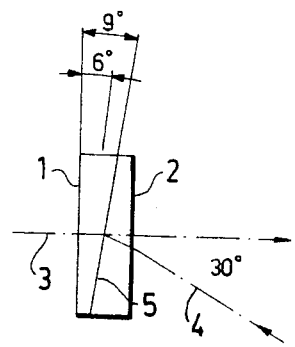
FIG. 1 illustrates one embodiment of the invention, by way of example.

The element shown in FIG. 1 is composed of two identical wedge glasses 1 and 2 which are connected in such a way that they form together a parallel-faced flat plate or disc. This plate should suitably be so disposed within an instrument that its external, flat bounding faces are perpendicular to the optical axis of the instrument, whereby the main beam path will pass through the same without being disturbed. The face of association or junction, 5, is reflecting. In the present embodiment, it has been desired to impart to the diverted beam path 4 a direction forming an angle of 30° with the main beam path, this being frequently a favourable direction from the point of view of design. Owing to the fact that ray 4 will enter the bounding face 2 of the element according to the invention at a more acute angle, it will be refracted along a line extending closer to the direction of the main beam path. Therefore, it has been possible to arrange the junction face 5 between the two wedge glasses, which constitute the beam-path splitting face of the element, at an angle from the perpendicular to the main beam path as small as 9°. If it had been desired, in a corresponding case, to utilize as the splitting element an inclined glass plate, then it would have been necessary to dispose the latter at an angle of 15° from the perpendicular to the main beam path. In addition to this, however, since the splitting or dividing face of the element according to the invention is situated within a glass body, on sighting through the latter it will appear to have a still smaller inclination. In the present example, it will form an apparent angle with said perpendicular of no more than 6°. This fact makes it possible to provide the splitting or dividing face with a reticle or the like. The splitting or dividing face could instead be provided with a semi-reflecting metallized coating, or the two wedge glasses could be separated by a spacing member so as to form an air gap therebetween.

Figure 2:
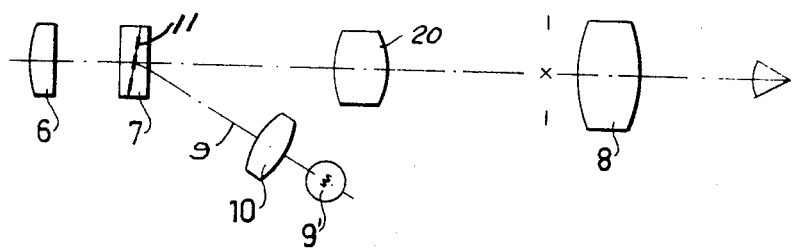
FIG. 2 illustrates the invention as applied to the optics of a gun-sight telescope, being shown purely diagrammatically.

FIG. 2 illustrates diagrammatically the optics of a gunsight telescope comprising an objective 6 with an image erecting system, a collimator 20, and an ocular 8. Interposed in the beam path is a splitter, or divider, element 7 according to the present invention adapted to divert a secondary beam path 9 at a suitable angle to the main beam path. It is common practice in a sight to utilize a reflecting device to introduce into the main beam path the image of a reticle or the like disposed in the diverted beam path. In the sight here shown it has been possible instead to dispose a reflecting reticle 11 between the wedge glasses of element 7, thanks to the above-mentioned favourable conditions of inclination of the splitting or dividing face thereof. The reticle 11 is illuminated by a light source 9 through a collecting-lens system 10 and will thus be visible as a brightly shining mark. In a similarly organized prior-art gun-sight telescope a reticle is reflected in the diagonal junction face of an Abbe prism into the ocular of the optical system, this diagonal junction being provided with transparent silvering. This transparent silvering, of course, will absorb a portion of the light emanating from the target, the latter thus getting dulled whereby the sight will be rather ineffective. Even if this defect is tolerated, the sight mark will have to be illuminated even in daylight, since otherwise it would be invisible. In the sight of FIG. 2 of the present application, the target will be visible without any losses in light energy, and the reticle 11 will be visible as a black figure which will only need extra illumination when daylight illumination is insufficient.

Figure 3:
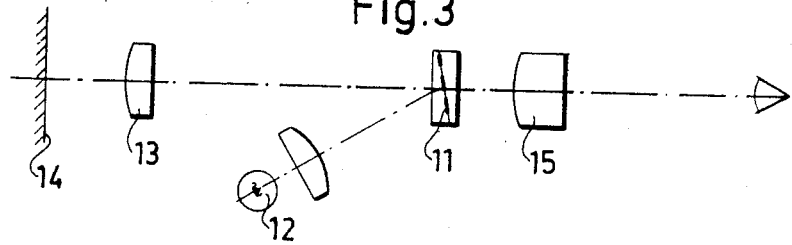
FIG. 3 is a similar diagrammatical showing of the application of the present invention to an auto-collimator.

FIG. 3 diagrammatically illustrates an auto-collimator having a similar arrangement. In this case too, a reflecting reticle or other figure 11 has been interposed between the two wedge glasses. The side of this figure facing away from the observer is illuminated by a light source 12, and the image thereof is projected by the objective 13 onto a mirror 14. Movements of the mirror, or the angular positions thereof, in a conventional manner, are indicated in the ocular 15 as a displacement of the illuminated figure relative to the image of the dark side of the figure facing the observer's eye.

Figure 4:
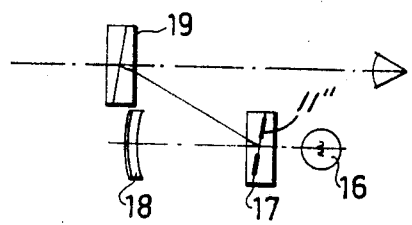
FIG. 4 is a similar diagrammatic view of the invention as applied to a reflex sight.

It is seen, of course, that image errors will occur in the wedge having the reflecting surface within the element. Therefore, it will be necessary in certain cases to introduce some kind of compensating or correcting element into the beam path. In the simplest case, this element may be a similar wedge disposed in the beam path and incorporated in a second element according to the present invention. Such an arrangement is shown in FIG. 4 which diagrammatically illustrates a reflex sight. Light emitted by the light source 16 will pass through the element 17 and is reflected along a parallel-displaced line by the spherical mirror 18 onto a reflecting sight mark 11″ disposed in the splitting or dividing junction of element 17. The image of the illuminated reticle 11″ is partially reflected by the second splitting or dividing element 19 and is superimposed onto the target image directly observed through this last-mentioned element. The splitting or dividing face within element 19 is coated with a partially reflecting metallization.

What is claimed is:

1. In an optical instrument for merging two light beams into one beam-path comprising at least one beam merging device including two transparent wedge-shaped glasses having their inclined faces adjacent one another to form a beam merging body and the partition face of which is made at least partially reflecting, the improvement wherein said wedge-shaped glasses are made of two relatively thin and flat wedge lamellas which together form a parallel-faced flat plate, in which a figure made of a reflecting material is interposed between said two wedge glasses, said beam merging device is placed in such a position in the instrument that one of said two beams to be merged will enter and be reflected through one and the same parallel face of said flat plate and the other one of said beams will pass through said flat plate.

2. The instrument of claim 1 wherein the figure is a reticle.

References Cited

UNITED STATES PATENTS

| | | | |
|---|---|---|---|
| 1,862,031 | 6/1932 | Patterson | 350—173 X |
| 1,989,317 | 1/1935 | Harper | 350—173 |
| 2,171,571 | 9/1939 | Karnes. | |
| 2,978,950 | 4/1961 | Mandler | 350—10 X |
| 3,315,581 | 4/1967 | Ruhle et al. | 88—1.5 |
| 3,402,976 | 9/1968 | Littmann | 350—33 |

DAVID SCHONBERG, Primary Examiner

R. L. SHERMAN, Assistant Examiner

U.S. Cl. X.R.

350—174; 356—251